United States Patent [19]

Dishner

[11] Patent Number: 4,736,151
[45] Date of Patent: Apr. 5, 1988

[54] BI-DIRECTIONAL BUCK/BOOST DC/DC CONVERTER

[75] Inventor: Bryan W. Dishner, Roscoe, Ill.
[73] Assignee: Sundstrand Corporation, Rockford, Ill.
[21] Appl. No.: 946,444
[22] Filed: Dec. 23, 1986
[51] Int. Cl.$^4$ .................. G05F 1/445; H02M 3/335
[52] U.S. Cl. .................. 323/224; 323/222; 363/16
[58] Field of Search .............. 363/16, 21, 97, 101; 323/271, 222, 224

[56] References Cited

U.S. PATENT DOCUMENTS

| | | | |
|---|---|---|---|
| 4,186,437 | 1/1980 | Cuk | 363/16 X |
| 4,245,286 | 1/1981 | Paulkovich et al. | 363/21 |
| 4,347,474 | 8/1982 | Brooks et al. | 323/222 X |
| 4,382,188 | 5/1983 | Cronin | 318/13 X |
| 4,395,675 | 7/1983 | Toumani | 323/271 |
| 4,572,961 | 2/1986 | Borger | 322/40 |
| 4,578,630 | 3/1986 | Grosch | 323/271 |
| 4,661,762 | 4/1987 | Baker | 322/40 |

OTHER PUBLICATIONS

Electrically Compensated Aircraft Alternator Drive, J. J. Cathey, 1983, IEEE.

Primary Examiner—Peter S. Wong
Attorney, Agent, or Firm—Wood, Dalton, Phillips, Mason & Rowe

[57] ABSTRACT

A bi-directonal DC/DC converter includes a first power switch coupled to a first input/output of the converter, an energy storage element coupled to the first power switch, a second power switch coupled between the energy storage element and a second input/output of the converter and means for controlling the first and second power switches so that one of the power switches is opened while the other power switch is alternately opened and closed to transfer power from one input/output to the other input/output.

7 Claims, 6 Drawing Sheets

BI-DIRECTIONAL BUCK/BOOST DC/DC CONVERTER

TECHNICAL FIELD

The present invention relates generally to power converters, and more particularly to a DC/DC converter.

BACKGROUND

Currently known DC/DC converters are of various types, including buck, boost or buck/boost types. The buck and boost types develop decreased and increased output voltages relative to an input voltage, respectively. The buck/boost converter can function as either a buck or a boost converter depending upon the duty cycle of one or more switches in the converter.

Most DC/DC converters utilize power switches which control the flow of power through a transformer primary winding. An induced voltage established in a transformer secondary winding is rectified and filtered to produce the DC output. Such types of converters are necessarily large and heavy due to the use of the transformer.

A further type of converter is disclosed in Paulkovich et al U.S. Pat. No. 4,245,286. This patent discloses a buck/boost regulator which includes a first switch which is coupled between an input of the regulator and an inductor and a transformer winding. A capacitor and load are coupled through diodes to the inductor and the transformer winding. A pulse width modulator senses the voltage across the load and controls the first switch as well as second and third switches which are coupled across the ends of the transformer winding to control the voltage delivered to the load.

The Paulkovich regulator, however, is relatively complex in that it requires a large number of components together with a transformer winding.

There may be times when it is necessary or desirable to transfer power bi-directionally through a DC/DC converter. For example, as disclosed in Dishner et al U.S. patent application Ser. No. 893,943, filed Aug. 6, 1986, entitled "Power Converter for an Electrically-Compensated Constant Speed Drive" and assigned to the assignee of the instant application, the disclosure of which is hereby incorporated by reference, there is disclosed an electrically-compensated constant speed drive which develops constant speed motive power from variable speed motive power provided by a prime mover. The drive includes first and second permanent magnet machines having electrical power windings which are interconnected by first and second AC/DC converters and a DC/DC converter. In this constant speed drive, one of the machines is operated as a generator while the other is operated as a motor so that the speed of an output shaft of the drive is maintained constant even with changes in speed of the prime mover. The DC/DC converter used in this constant speed drive is complex in nature since it must be capable of bi-directional operation, i.e. it must be capable of transferring power from one machine to the other and vice versa, and it must be capable of boosting or bucking the voltage in both directions of power flow. The converter includes steering switches which connect an input of the converter to one of the AC/DC converters and an output of the converter to the other of the AC/DC converters, an inverter for converting DC power developed by one of the AC/DC converters into intermediate AC power, a transformer for shifting the voltage of the intermediate AC power and a rectifier for rectifying the output of the transformer so that output DC voltage is developed. Bypass switches are also provided in the event it is desired to bypass the DC/DC converter.

While the DC/DC converter described in the above-referenced patent application performs satisfactorily for its intended purpose, it would be desirable to reduce the number of components used therein to in turn reduce the size and weight of the overall constant speed drive.

It has been found that by appropriately limiting the speed range of the prime mover, the DC/DC converter can be simplified since the converter need only buck voltage when power flow is in one direction and need only boost voltage when power flow is in the opposite direction. A converter which is capable of such operation is disclosed in Dishner U.S. patent application Ser. No. 946,086, filed Dec. 23, 1986, entitled "Boost/Buck DC/DC Converter" and assigned to the assignee of the instant application.

DISCLOSURE OF INVENTION

In accordance with the present invention, a DC/DC converter is capable of bi-directional power flow and can boost or buck an input voltage for power flow in both directions, yet is simple in design.

In a broad sense, the DC/DC converter includes a power switch coupled to an input of the converter, an energy storage element coupled to the power switch, a diode coupled between the energy storage element and an output of the converter and means for opening and closing the power switch at a variable duty cycle so that a voltage at the converter input is boosted when the duty cycle is greater than one-half and is bucked when the duty cycle is less than one-half.

In addition, a further switch is coupled across the diode between the energy storage element and the output of the converter and a further diode is coupled across the first power switch. Power flow from the input to the output is accomplished as noted above while keeping the further switch open. Power flow in the reverse direction from the output to the input may be effected by opening the first switch and alternately opening and closing the further switch. In either event, the duty cycle of operation of the alternately opened or closed switch determines whether the voltage is boosted or bucked.

The DC/DC converter of the present invention is particularly adapted for use in the electrically-compensated constant speed drive disclosed in the above-noted Dishner et al patent application.

BEST MODE FOR CARRYING OUT THE INVENTION

Figure 1:
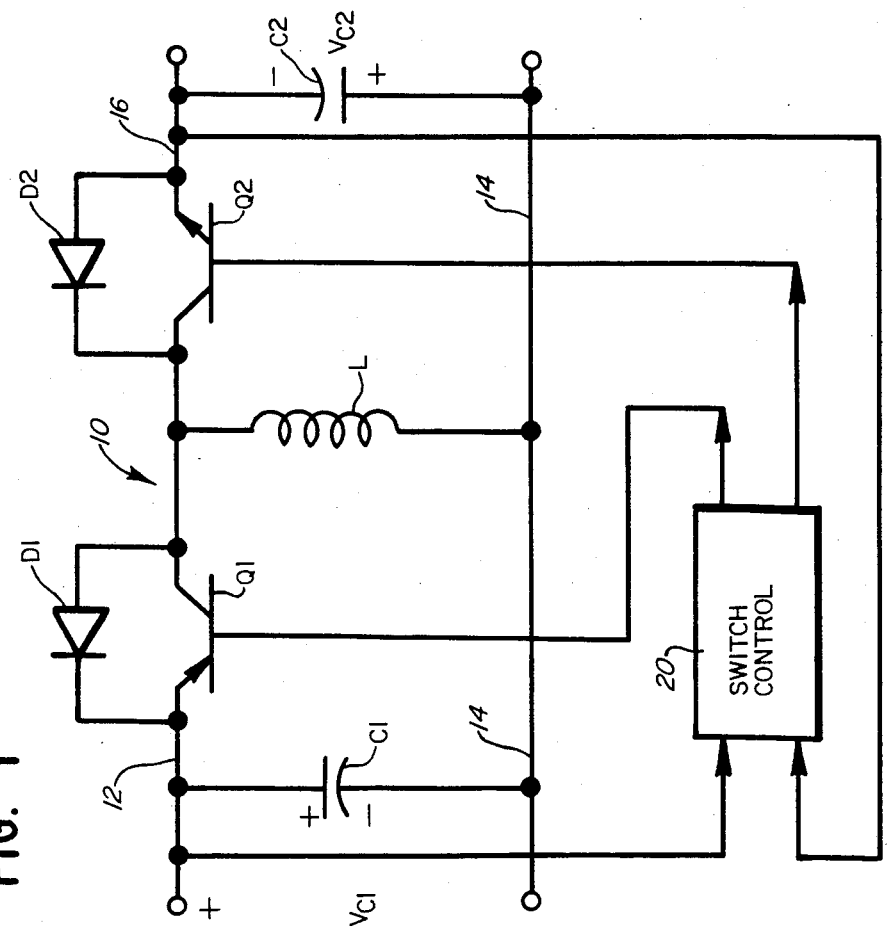
FIG. 1 is a combined schematic and block diagram of the converter of the present invention.

Referring now to FIG. 1, a DC/DC converter 10 according to the present invention includes a first power switch Q1 which is coupled between a first line 12 and an energy storage element comprising an inductor L. The line 12 together with a second line 14 together comprise a first input/output of the converter 10.

A first diode D1 is coupled across the power switch Q1 and is poled to conduct current in a direction opposite to the direction of current through the power switch Q1. A first capacitor C1 or other energy storage element is coupled across the lines 12, 14.

A second power switch Q2, preferably of complementary conductivity type with respect to the switch Q1, is coupled between the inductor L and a third line 16 of the converter 10. The third line 16 and the second line 14 together comprise a second input/output of the converter 10. A second capacitor C2 or other energy storage element is coupled across the lines 14, 16.

A second diode D2 is coupled across the power switch Q2 and, like the diode D1, is poled to conduct current in a direction opposite to the direction of current through the switch Q2.

As seen in FIG. 1, the inductor L includes a first end which is coupled to each of the switches Q1 and Q2 and a second end which is coupled to the second line 14.

The switches Q1 and Q2 are controlled by a switch control circuit 20 in accordance with the voltage on one or both of the first and third lines 12, 16.

In general, the converter 10 is capable of boosting or bucking the voltage $V_{C1}$ appearing at the first input/output before it is applied to the second input/output as an output voltage $V_{C2}$. Alternatively, the voltage $V_{C2}$ at the second input/output may be boosted or bucked before it is applied to the second input/output as a voltage $V_{C1}$. The degree of boosting or bucking is regulated by controlling the duty cycle of operation of the switches Q1 and Q2.

Figure 2:
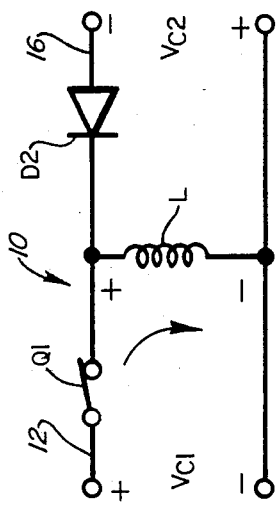
FIGS. 2 and 3 are equivalent schematic diagrams illustrating the operation of the converter shown in FIG. 1 when power flow is in a first direction.

Referring now to FIG. 2, there is shown an equivalent schematic diagram illustrating the operation of the converter 10 when it is desired to accomplish power flow from the first input/output to the second input/output. The switch control 20 maintains the power switch Q2 off (i.e. opened) during this time while the switch Q1 is operated alternately between on (or closed) and off (or opened) states at a constant or variable duty cycle. The schematic of FIG. 2 illustrates the equivalent circuit while the switch Q1 is closed. During such time, current flows from the capacitor C1 through the lines 12 and 14, the closed switch Q1 and the inductor L so that the inductor stores electrical energy. Also during this time, the diode D2 prevents current flow into the line 16 so that all of the current flowing through the switch Q1 flows through the inductor L.

Figure 3:
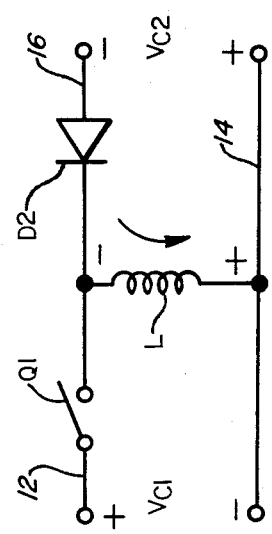

As seen in FIG. 3, when the switch Q1 is subsequently opened, the voltage across the inductor reverses in polarity and current flow occurs through the line 16, the diode D2, the inductor L and the line 14 to the second capacitor C2. The inductor, therefore, releases the stored energy in this portion of the cycle.

Figure 4:
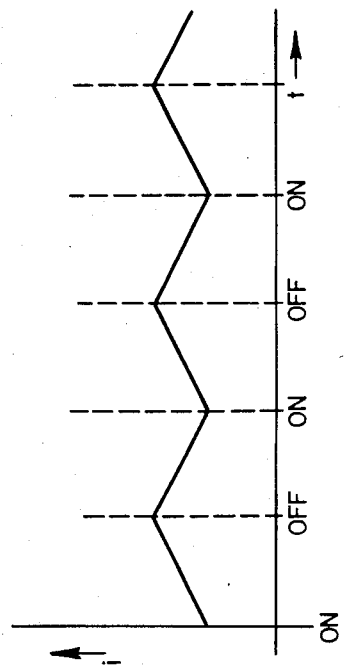
FIG. 4 is a waveform diagram illustrating the operation of the converter.

As seen in FIG. 4, the current through the inductor L is approximately triangular in shape. The voltage $V_{C2}$ induced at the second input/output is less than the voltage $V_{C1}$ when the duty cycle is less than a reference value of one-half and is greater than the voltage $V_{C1}$ when the duty cycle is greater than the reference value. In the embodiment illustrated in the figures, the transfer function is as follows:

$$V_{C2}V_{C1}/=-DC_1(1-DC_1)$$

where $DC_1$ is the duty cycle of the switch Q1 and the minus sign denotes the voltage reversal from the first input/output to the second input/output as shown in the Figures. As should be evident, the voltage $V_{C1}$ may be bucked by operating the switch Q1 at a duty cycle less than one-half and may be boosted by operating the switch Q1 at a duty cycle greater than one-half.

Figure 5:
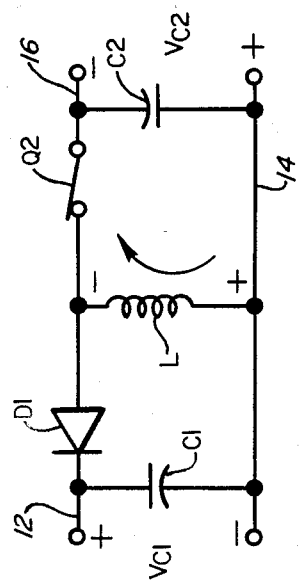
FIGS. 5 and 6 are equivalent schematic diagrams illustrating the operation of the converter shown in FIG. 1 for power flow in a direction opposite to that illustrated by the schematic diagrams of FIGS. 2 and 3.
Figure 6:
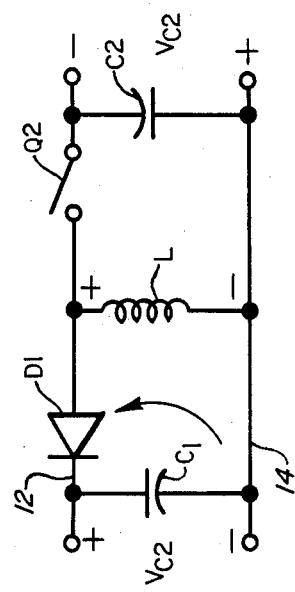

As seen in FIGS. 5 and 6, power flow in the reverse direction, i.e. from the second input/output to the first input/output, is accomplished by opening the switch Q1 and alternately opening and closing the switch Q2 at a variable or constant duty cycle. As seen in FIG. 5, when the switch Q2 is closed, current flows from the capacitor C2 through the second line 14, the inductor L, the switch Q2 and the third line 16. Subsequently, when the switch Q2 is opened as illustrated in FIG. 6, the voltage across the inductor L reverses in polarity and current flow commences through the second line 14, the inductor L, the diode D1 and the first line 12 into the capacitor C1. The transfer function for this mode of operation is as follows:

$$V_{C1}/V_{C2}=-DC_2/(1-DC_2)$$

where $DC_2$ is the duty cycle of the switch Q2 and the polarity of the output voltage is again as shown in the Figures. As before, the voltage $V_{C2}$ is bucked when the duty cycle of the switch Q2 is below the reference value and is boosted when the duty cycle of the switch Q2 is above the reference value.

It can be seen that the present invention can boost or buck voltage for power flow in either of two directions, and hence the converter is usable in a wide variety of applications, most notably to manage the flow of power between the permanent magnet machines disclosed in the above-referenced Disher et al application.

Figure 7:
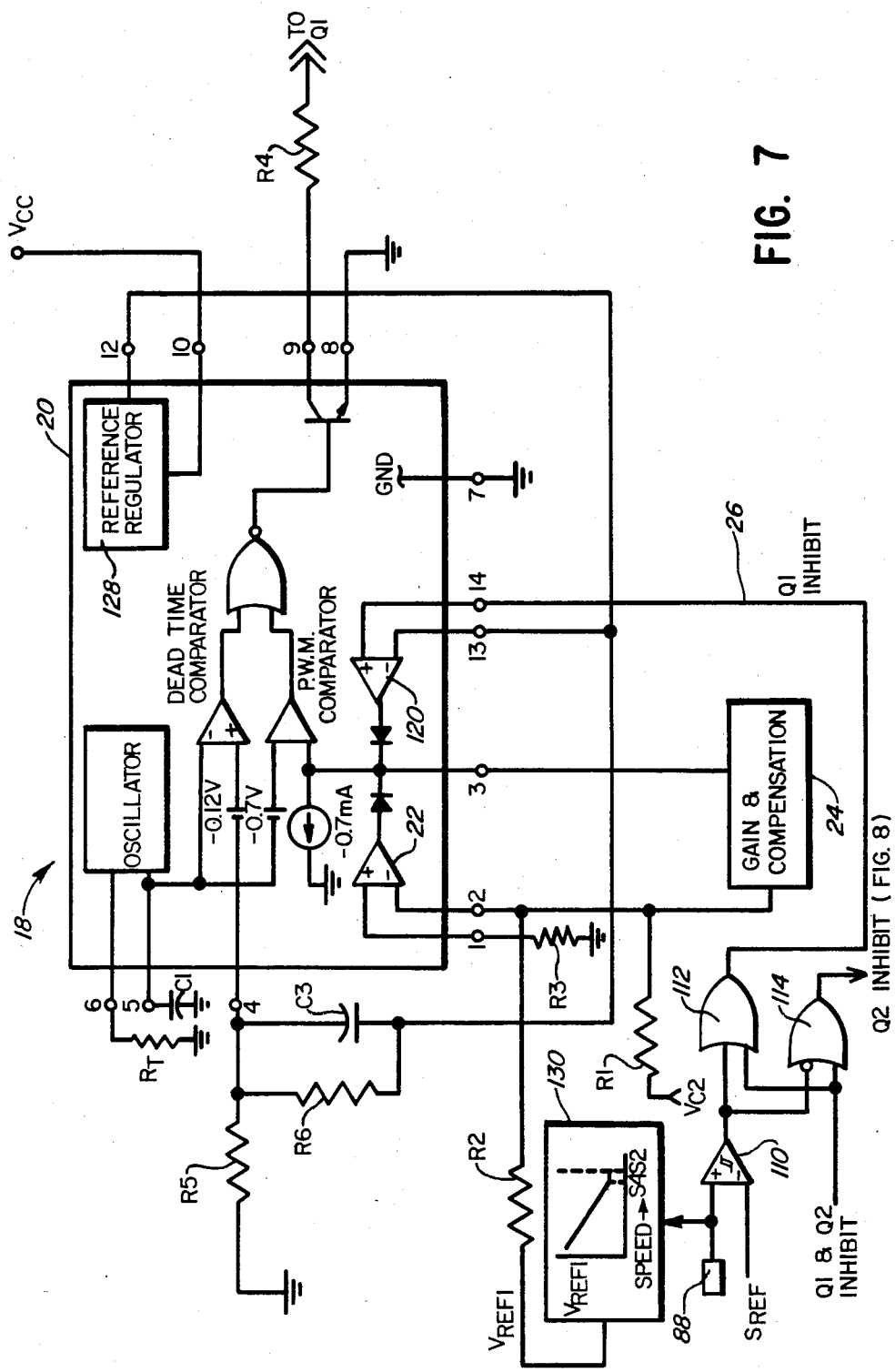
FIGS. 7 and 8 are combined block and schematic diagrams of circuitry for controlling the switches Q1 and Q2 shown in FIG. 1.

Referring now to FIG. 7, the switch Q1 is controlled by a pulse width modulator which is implemented in part by a Motorola MC35060 integrated circuit (IC) 20. The IC 20 is coupled to external circuitry at pins identified by numbers immediately outside of the representation thereof. The voltage $V_{C2}$ across the capacitor C2 is coupled to a pin 2 of the IC 20 by a resistor R1. A reference signal $V_{REF1}$ representing the desired voltage across the capacitor C2 is coupled to the pin 2 through a resistor R2. The signals $V_{REF1}$ and $V_{C2}$ are subtracted by an error amplifier 22 of the IC 20 to develop an error signal representing the deviation of the voltage $V_{C2}$ from the voltage $V_{REF1}$.

A gain and compensation circuit 24 is coupled between pins 2 and 3 and a resistor R3 is coupled between a pin 1 and ground potential to insure stable operation of the converter 10.

The IC 20 develops a pulse width modulated (PWM) waveform at a pin 9 in response to the error signal developed by the error amplifier 22. The PWM waveform is coupled by a resistor R4 to the base of the transistor Q1. If necessary or desirable, the output appearing at the pin 9 may be amplified before it is applied to the base of the transistor Q1.

A soft-start function may be implemented by connecting resistors R5 and R6 and a capacitor C3 to pin numbers 412 and 13 of the IC 20.

An inhibit control signal may be coupled over a line 26 to a pin number 14 of the IC 20. The line 26, when high, causes the IC 20 to disable the output appearing at the pin 9 so that the transistor Q1 is maintained in an off state. The inhibit signal is developed on a line 26 when power flow is to occur from the second input/output to the first input/output. The circuitry for generating the inhibit signal is described in detail hereinafter.

Figure 8:
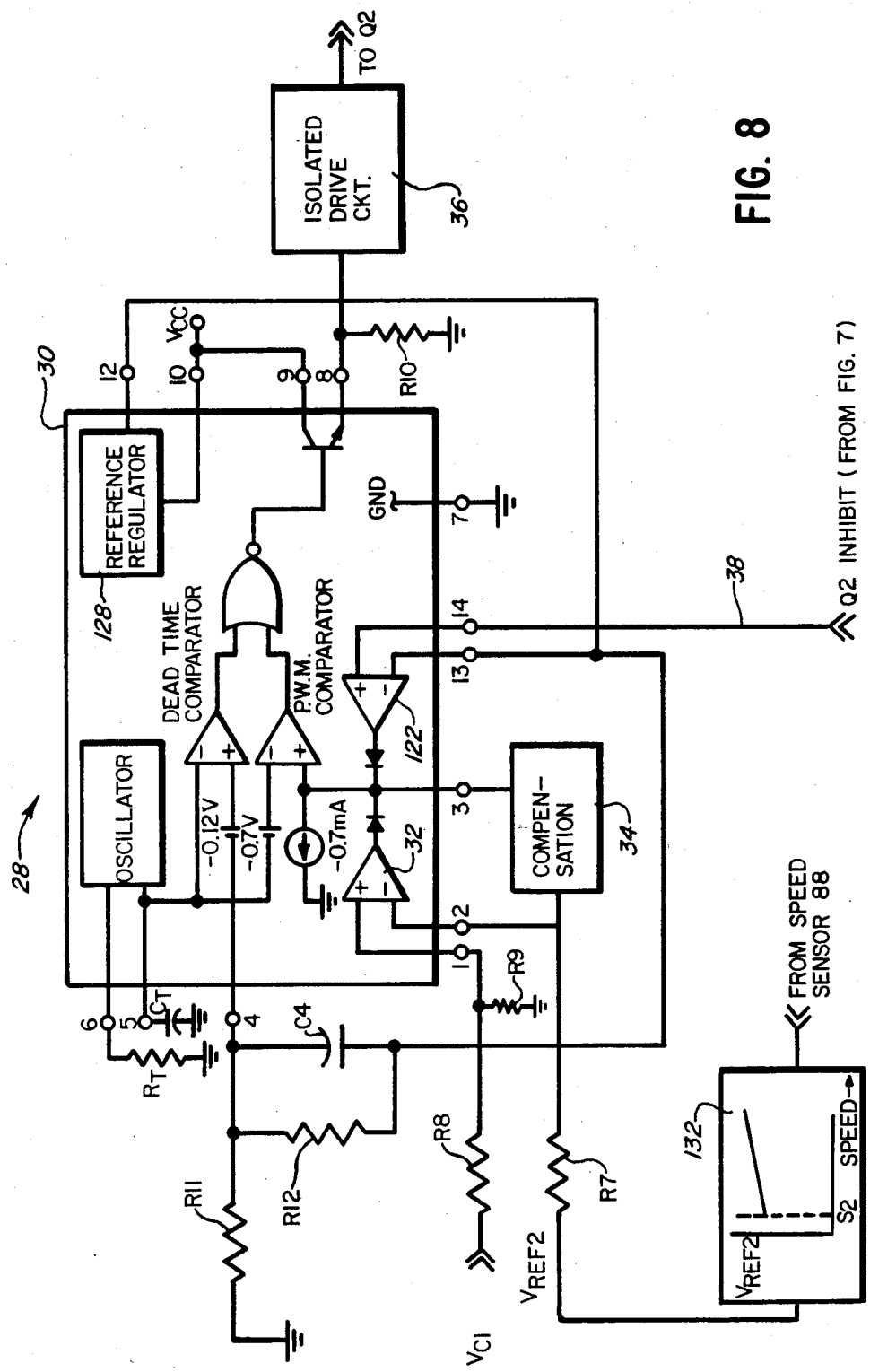

In like fashion, and with specific reference to FIG. 8, there is illustrated a combined block and schematic diagram of the control for the transistor Q2. The control utilizes an integrated circuit 30 which is identical to the IC 20 described in connection with FIG. 7. The voltage $V_{C1}$ is coupled through a voltage divider comprising resistors R8 and R9 to the pin 1 of the IC 30. A signal $V_{REF2}$ is coupled through a resistor R7 to the pin 2. The signal $V_{C1}$ is subtracted from the signal $V_{REF2}$ by an internal error amplifier 32 to develop an error signal.

A gain and compensation circuit 34 is coupled between the pins 2 and 3 so that the converter 10 operates in a stable fashion.

The integrated circuit 30 develops a PWM waveform at a pin 8 in response to the error signal developed by the error amplifier 32. The PWM waveform is coupled through an isolated drive circuit 36 which develops isolated drive signals at proper levels for operating the transistor Q2.

A resistor R10 may be coupled between the pin 8 and ground potential so that the signals developed at the pin 8 are at a level which assures proper operation of the drive circuit 36. As distinguished from the circuit illustrated in FIG. 7, the pin 9 of the IC 30 is coupled to a voltage $V_{CC}$.

Again, a soft-start function may be implemented by resistors R11, R12 and a capacitor C4 which are coupled between the pins 4, 13 and 12 of the IC 30.

A further inhibit control signal may be coupled over a line 38 to pin number 14 of the IC 30. The inhibit control signal on the line 38, when high, disables the transistor Q2 when power flow is to occur from the first input/output to the second input/output.

Figure 9:
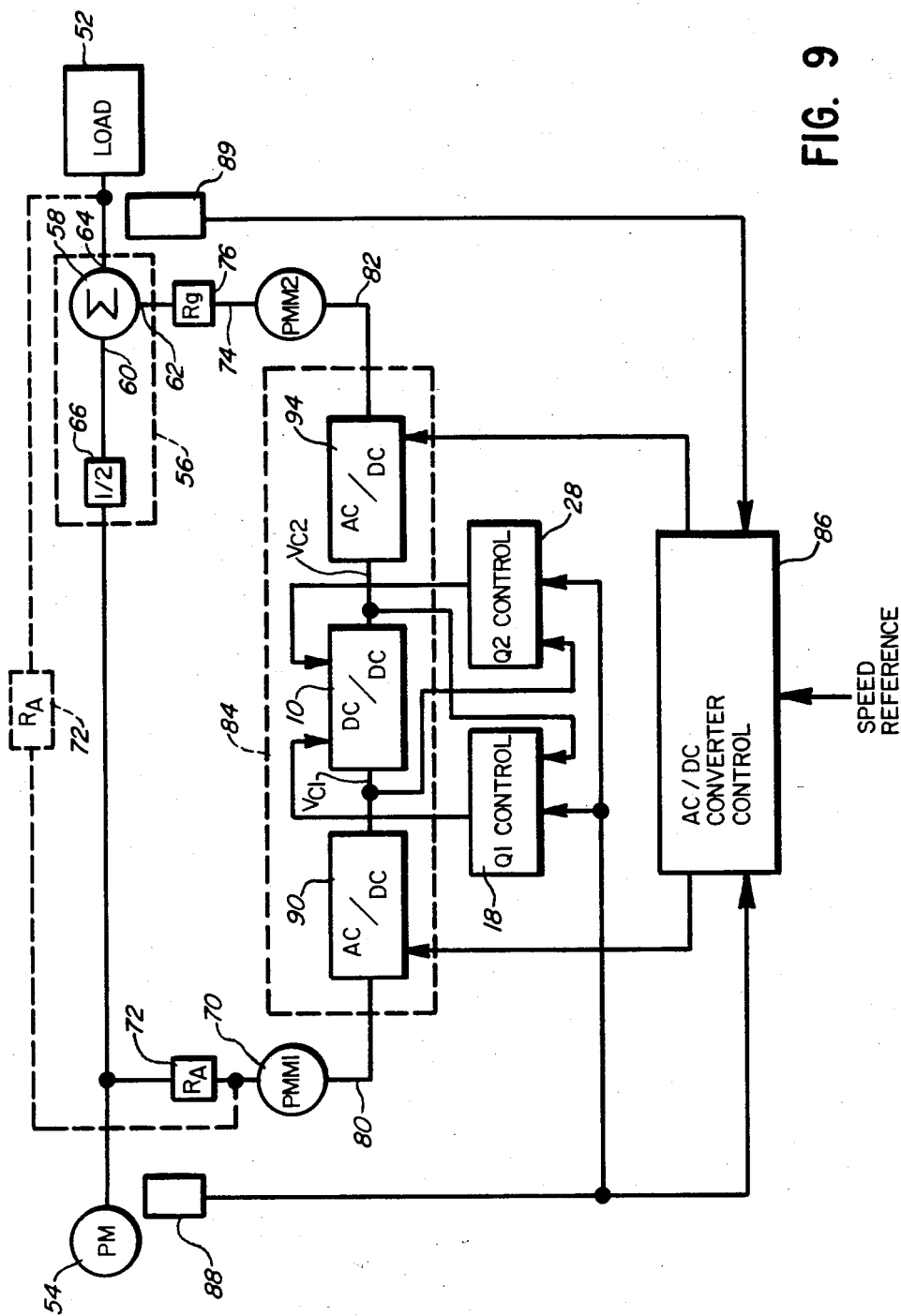
FIG. 9 is a block diagram of the electrically compensated constant speed drive disclosed in the above-identified patent application Ser. No. 893,943.

Referring now to FIG. 9, there is illustrated the electrically-compensated constant speed drive disclosed in the above-identified Dishner et al patent application together with the DC/DC converter 10 according to the present invention. The constant speed drive develops constant speed motive power for driving a load 52, such as a generator, from variable speed motive power developed by a prime mover 54. The drive includes a mechanical differential 56 which includes a speed summer 58 having a first input 60, a second input 62 and an output 64. The first input 60 of the speed summer is coupled to the output of the prime mover 54 via a block 66 which represents a 2:1 speed increase. This speed increase is an inherent operational characteristic of the differential 56. The output 64 of the speed summer 58 is coupled to the load 52.

A first permanent magnet machine PMM1 includes a motive power shaft 70 which is coupled by a gear box 72 to the output shaft of the prime mover 54. Alternatively, as noted by the dashed lines of FIG. 1, the motive power shaft of the PMM1 may be coupled through the gear box 72 to the output shaft 64 of the speed summer 58.

A second permanent magnet machine PMM2 includes a motive power shaft 74 which is coupled by a gear box 76 to the second input 62 of the speed summer 58.

The permanent magnet machines PMM1, PMM2 includes electrical power windings which are interconnected by conductors 80,82 and a power converter 84 which manages the flow of power between the machines PMM1, PMM2. The power converter 84 is controlled in part by an AC/DC converter control circuit 86 which receives a signal representing the desired speed of the output shaft 64 of the speed summer 58 and signals representing the actual speed of the prime mover 54 and/or the output speed of the differential 56 from sensors 88,89 respectively.

The constant speed drive is designed to operate above and below a prime mover speed condition known as "straight-through" which occurs when the output speed of the prime mover is equal to one-half the desired output speed of the differential 56. Referring to the graph of FIG. 10, the straight-through speed ST occurs approximately in the middle of the speed range of the constant speed drive and represents the condition at which the speed of the input 60 of the speed summer 58 is equal to the speed of the output 64, and hence the speed of the second input 62 is zero.

When the prime mover speed is below straight-through, the prime mover PMM2 must be operated as a motor to develop compensating speed of a direction and magnitude which augments the speed at the first input of the speed summer 58 so that the desired speed at the output 64 is maintained. Under these conditions, the machine PMM1 is operated as a generator to produce alternating current power on the conductors 80 which is delivered to a first bi-directional AC/DC converter 90 in the power converter 84. The AC/DC converter 90 converts the alternating current power into DC power under control of the converter control 86 and delivers same to the DC/DC converter 10. The DC/DC converter 10 is in turn coupled to a second bi-directional AC/DC converter 94. When the prime mover speed is below straight-through, power flow occurs froms the PMM1 to the PMM2 and the AC/DC converter 94 is operated by the converter control 86 as a motor inverter to energize the windings of the PMM2.

Figure 10:
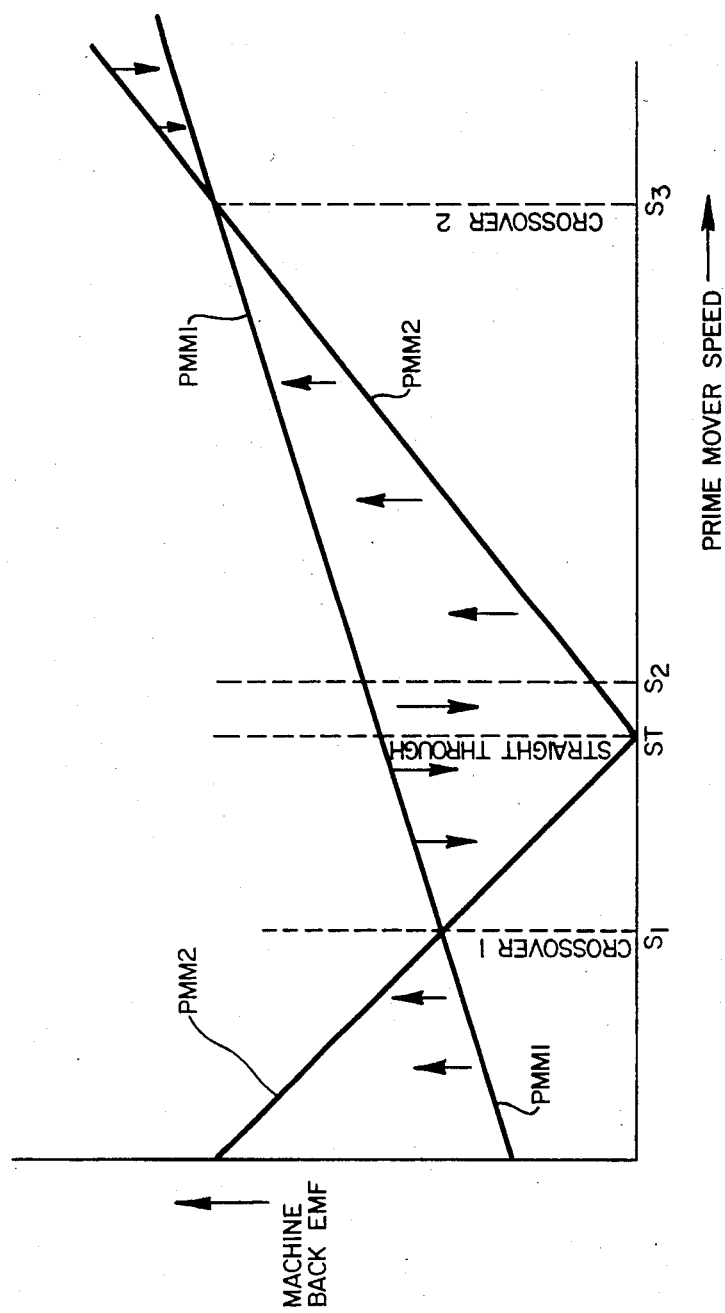
FIG. 10 is a graph illustrating machine back emf versus prime mover speed for both machines PMM1 and PMM2 shown in FIG. 9.

As is evident by an inspection of FIG. 10, the AC/DC converter 90 may develop a voltage which is greater than, equal to or less than the voltage required by the AC/DC converter 54 to operate the PMM2 at the required compensating speed. More specifically, below a first crossover speed $S_1$, the voltage developed by the PMM1 must be boosted before it is applied to the windings of the PMM2. Above the speed $S_1$ and below a speed $S_2$ which is the upper limit of the speed range for which power flow is from PMM1 to PMM2, the voltage developed by the PMM1 must be bucked before it is applied to the windings of the PMM2. At the first cross-over speed $S_1$, the voltage developed by PMM1 is exactly equal to the voltage required to operate the PMM2 at the desired speed.

Above the speed $S_2$, power is transferred from the PMM2 to the PMM1. Between the speed $S_2$ and a second cross-over speed $S_3$, the voltage developed by the PMM2 must be boosted before it is applied to the windings of the PMM1. Above this speed $S_3$, the voltage developed by the PMM2 must be bucked before it is applied to the PMM1. As a practical matter, the speed range of the prime mover is limited so that it is always below the speed $S_3$, although this need not be the case.

Referring again to FIG. 7, the control illustrated therein includes circuitry for inhibiting operation of one or both of the transistors Q1 and Q2 under certain conditions. Below the speed $S_2$ shown in FIG. 10, the transistor Q2 is held off while at speeds above $S_2$, the transistor Q1 is held off. This is accomplished by means of a level comparator 110 which compares the speed signal developed by the speed sensor 88 against a reference signal $S_{REF}$ representing the speed $S_2$. The output of the level comparator 110 is coupled to a first noninverting input of an OR gate 112 and an inverting input of an OR gate 114. Second noninverting inputs of the OR gates 112,114 receive an inhibit command signal which may be developed, for example, by a comparator (not shown) which develops a high state signal when the prime mover speed is outside of an operational range. Also, the inhibit command signal may be placed in a high state when a fault arises in the circuitry for controlling the switches Q1,Q2 or in another part of the converter or constant speed drive.

It should be noted that the level comparator 110 is designed to include hysteresis to prevent dithering of the controls when the prime mover speed is in the vicinity of the speed $S_2$.

The OR gates 112,114 develop Q1 and Q2 inhibit signals, respectively. The Q1 inhibit signal is coupled to a pin 14 of the IC 20 while the Q2 inhibit signal is coupled to a pin 14 of the IC 30. The level of the signal at the pin 14 of each of the IC's 20,30 is compared with a reference signal at a pin 13 by an internal comparator 122,124, respectively. When either inhibit signal is generated, the current flowing into the pin 9 of the respective IC 20,30 drops to a zero level so that the transistor Q1 and/or Q2 is turned off.

In each of the control circuits illustrated in FIGS. 7 and 8, the reference signal coupled to the pin 13 is developed by an internal reference regulator 128 of the IC 20 or 30. It should be noted that the reference signals coupled to the pins 13 of the IC's 20,30 may instead be developed by different circuits, if desired.

The reference signals $V_{REF1}$ and $V_{REF2}$ are generated by first and second function generators 130,132, respectively. Both function generators are responsive to the speed signal developed by the speed sensor 88. The function generator 130 decreases the amplitude of the signal $V_{REF1}$ with increasing prime mover speed until a speed $S_4$ is reached. Beyond the speed $S_4$, the signal $V_{REF1}$ is held constant until the speed $S_2$ is attained. Above the speed $S_2$, the level of the signal $V_{REF1}$ is immaterial and may be maintained at a zero level.

The reference signal $V_{REF1}$ controls the input voltage to the converter 94 so that PMM2 can be operated as a motor at the required speed when the prime mover speed is below the speed $S_2$.

The function generator 132 increases the magnitude of $V_{REF2}$ with increasing prime mover speed up to the upper limit of the system operating range. Below the speed $S_2$ and above the upper limit of the speed range, the signal $V_{REF2}$ may be maintained at a zero level.

The reference signal $V_{REF2}$ controls the input voltage to the converter 90 so that PMM1 is operated as a motor at the speed determined by the prime mover and gear box 72 at prime mover speeds above $S_2$ and below the upper limit of the speed range.

It should be noted that $V_{REF1}$ and $V_{REF2}$ may alternatively be made constant over the prime mover speed range, in which case the converters 90,94 would need to control the voltage applied to the machines PMM1 and PMM2. Other system variables, such as output power, could also be used to determine $V_{REF1}$ and $V_{REF2}$ in order to optimize system performance.

I claim:

1. A DC/DC converter, comprising:
   a first power switch coupled to a first input/output of the converter;
   an energy storage element coupled to the first power switch;
   a second power switch coupled between the energy storage element and a second input/output of the converter; and
   means for controlling the first and second power switches so that one of the power switches is maintained in an opened state while the other power switch is alternately opened and closed to transfer power from one input/output to the other input/output.

2. The DC/DC converter of claim 1, further including means for preventing current flow from one input/output to the other input/output when one of the power switches is conductive so that all of the current passing through such conductive switch flows through the energy storage element while such switch is conductive.

3. The DC/DC converter of claim 2, wherein the power switches, when closed, conduct unidirectional current and wherein the preventing means comprises first and second diodes coupled across and associated with the first and second power switches, respectively, each diode being poled to conduct current in a direction opposite the direction of current flow through the associated power switch.

4. The DC/DC converter of claim 1, wherein the energy storage element comprises an inductor.

5. The DC/DC converter of claim 1, wherein the controlling means comprises means for determining whether power is to be transferred from the first input/output to the second input/output, or vice versa, means for opening the second power switch and for alternately opening and closing the first power switch if power is to be transferred from the first input/output to the second input/output and means for opening the first power switch and for alternately opening and closing the second power switch if power is to be transferred from the second input/output to the first input/output.

6. The DC/DC converter of claim 5, wherein the controlling means further comprises means establishing the desired voltage to be developed at the other input/output, means for alternately opening and closing the other power switch at a duty cycle greater than a reference value when a voltage at the one input/output is less than the desired voltage to be developed at the other input/output and means for alternately opening and closing the other power switch at a duty cycle less than the reference value when the voltage at the one input/output is greater than the voltage to be developed at the other input/output.

7. The DC/DC converter of claim 1, wherein the controlling means includes means for alternately opening and closing the other power switch at a duty cycle greater than one-half when a voltage at the one input/output is to be boosted and applied to the other input/output and for alternately opening and closing the other power switch at a duty cycle less than one-half when the voltage at the one input/output is to be bucked and applied to the other input/output.

* * * * *